United States Patent [19]
Bowling

[11] Patent Number: 6,062,068
[45] Date of Patent: May 16, 2000

[54] LEAKAGE TESTING METHOD FOR A PLATE HEAT EXCHANGER

[75] Inventor: Michael Bowling, Bridgwater, United Kingdom

[73] Assignee: Somerset Technical Laboratories Ltd., United Kingdom

[ * ] Notice: This patent issued on a continued prosecution application filed under 37 CFR 1.53(d), and is subject to the twenty year patent term provisions of 35 U.S.C. 154(a)(2).
This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/175,659

[22] Filed: Oct. 20, 1998

Related U.S. Application Data

[63] Continuation of application No. 08/530,298, Sep. 28, 1995, Pat. No. 5,872,308, which is a continuation of application No. PCT/GB94/02739, Dec. 14, 1994.

[30] Foreign Application Priority Data

Dec. 14, 1993 [GB] United Kingdom ................ 93 25 591

[51] Int. Cl.$^7$ .............................. G01M 3/18; G01M 3/22
[52] U.S. Cl. ........................... 73/40; 73/40.7; 73/40.5 R
[58] Field of Search ................................... 73/40, 40.5 R, 73/40.7

[56] References Cited

U.S. PATENT DOCUMENTS

| | | |
|---|---|---|
| 2,658,728 | 11/1953 | Evans, Jr. ..................................... 73/40 |
| 3,522,008 | 7/1970 | Defabaugh et al. . |
| 4,138,856 | 2/1979 | Orlowski .......................... 73/40.5 R X |
| 4,550,688 | 11/1985 | Zuber et al. . |
| 5,872,308 | 2/1999 | Bowling .............................. 73/40.7 X |

FOREIGN PATENT DOCUMENTS

| | | |
|---|---|---|
| 0184521 | 6/1986 | European Pat. Off. . |
| 4035092 | 5/1992 | Germany . |
| 59-125036 | 7/1984 | Japan . |
| 63-034492 | 2/1988 | Japan . |
| 63-156997 | 6/1988 | Japan . |
| 3-150498 | 6/1991 | Japan . |
| 2-230093 | 9/1993 | Japan . |
| 1518476 | 7/1978 | United Kingdom . |
| 1536291 | 12/1978 | United Kingdom . |

OTHER PUBLICATIONS

Fels, W., "Schnellnachweis von Plattendurchbruchen bei Warmeaustauschern", Molkerei–Zeitung Welt der Milch, 1985, vol. 39, No. 21, pp. 601–603.

*Primary Examiner*—Daniel S. Larkin

[57] ABSTRACT

A vessel such as a dairy pasteuriser having a path B for product and a separate path A for coolant in intimate relationship is tested for leaks by circulating a donor fluid under pressure in path A whilst a recipient fluid such as clean tap water is circulated in path B. If the donor fluid is an electrolyte, a probe 12 is placed in path B to measure the conductivity of the recipient fluid. A rise in conductivity over a period indicates leakage between the two paths, the rate of change indicating the size of the leak. Alternatively, the donor fluid can be a gas, and leakage detected using an untrasound probe.

4 Claims, 2 Drawing Sheets

LEAKAGE TESTING METHOD FOR A PLATE HEAT EXCHANGER

This application is a continuation of application Ser. No. 08/530,298, filed Sep. 28, 1998, now U.S. Pat. No. 5,872,308, which is a continuation of PCT/GB 94/02739, filed Dec. 14, 1994.

TECHNICAL FIELD OF THE INVENTION

This invention relates to a method of detecting leaks through flaws in heat exchangers and the like.

BACKGROUND

Pasteurisers used in the dairy process industry typically include a product path in which the milk is placed for treatment. A heating and/or cooling medium is passed through a separate circuit in close heat-exchange relationship with the product path via a number of heat exchange plates. Modern pasteurisers of this kind are known as HTST (High Temperature, Short Time) pasteurisers.

From time to time, leaks can develop between the heating/cooling circuit and the product path. Such leaks can be very costly, not only because the contaminated product must be discarded but also due to the cost of finding and rectifying the leak. Present preventive maintenance techniques involve shut down of the plant, dismantling of the pasteuriser, detailed examination and testing of the individual heat exchange plates using mechanical and/or chemical tests, careful cleaning of the components, re-assembly with new seals, pressure and leak testing, and recommission of the reassembled pasteuriser. Such a procedure results in considerable lost production time whilst the equipment is out of commission, is extremely labour intensive, and involves the cost of new seals. In addition, there is a substantial risk that further leaks can inadvertently be introduced during the re-building process.

An aim of the present invention may be viewed as being to overcome these problems.

SUMMARY OF THE INVENTION

The present invention proposes a method of testing for leakage.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
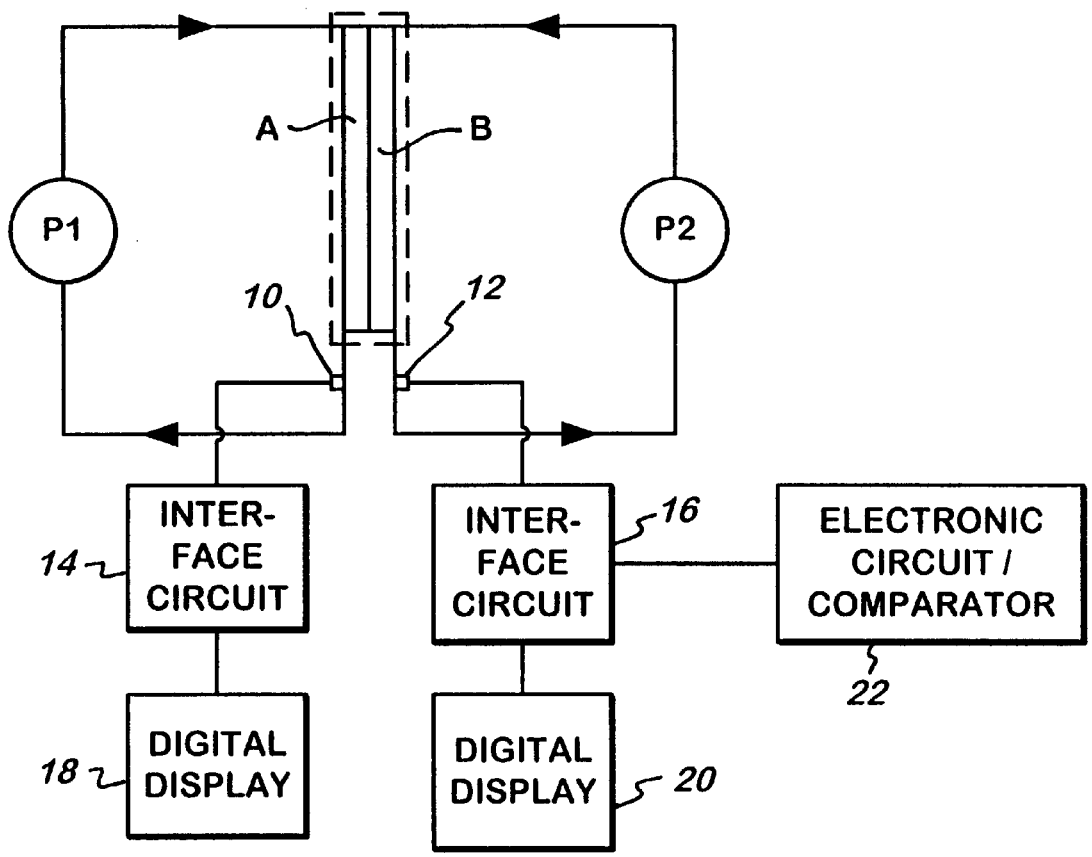
FIG. 1 is a diagrammatic representation of a dairy pasteuriser undergoing a first testing method in accordance with the invention

In FIG. 1, the dairy pasteuriser in question is outlined by dashed lines. The pasteuriser is a form of heat exchanger having a first path A for coolant and a second path B for the milk product. The two paths A and B are in intimate relationship to provide heat exchange between the two paths in normal use so that, should any leaks develop between paths A and B, the product in path B will become contaminated with coolant.

In the method of the invention, the pasteuriser is tested for leaks between paths A and B without any necessity to dismantle the pasteuriser. A donor fluid (see below) is circulated through path A in a closed loop by means of a circulation pump P1, while a recipient fluid (again, see below) is circulated in a closed loop through path B using a pump P2. Contacting type conductivity probes 10 and 12 of known construction are placed in the donor fluid and recipient fluid paths A and B respectively. Each probe is connected via a suitable electronic interface circuit 14, 16 (e.g. a Model 697C1 Conductivity Transmitter available from Great Lakes Instruments, Inc. of Milwaukee, Wis.) to a digital display 18, 20 respectively, which gives a conductivity readout in suitable units such as milli siemens/cm. The probe 12 in the recipient fluid circulation path B is also connected via interface 16 to an electronic circuit 22 that monitors the conductivity reading at regular intervals, stores the reading, and displays the difference between the last two readings (which will be referred to below as value X).

By way of example, clean tap water can be used as the recipient fluid, with a solution of a salt and water as the donor fluid. The donor fluid is usually circulated under a higher pressure than the recipient fluid, e.g. at 45 psi. Any suitable electrolyte may be used as the donor fluid, but ordinary common salt (sodium chloride) gives good results. The presence of salt in water increases the conductivity of the water by an amount which depends upon the salt concentration. For example, a common salt concentration of 0.05 grams/liter gives a conductivity of 100 micro siemens/cm whereas a concentration of 0.25 grams/liter gives a conductivity reading of 500 micro siemens/cm. Thus, if value X is zero (no change in conductivity in the recipient fluid) there is no leak, but a steady increase in the conductivity of the water circulating in the recipient fluid path B indicates that electrolyte has leaked from the donor fluid into the recipient fluid. For a given concentration of salt in the donor fluid and applied pressure differential, the rate of change in conductivity, X, gives a direct indication of the size of the leak, larger leaks giving rise to a greater rate of change in conductivity and hence a larger value of X.

The equipment may give spurious readings at first whilst salt concentrations, pressures and flow rates stabilise, but after a short period the value of X will stabilise. Probe 10 allows the salt concentration on the donor fluid side to be monitored. By using a standard concentration of salt in the donor fluid (or by making an appropriate adjustment for salt concentration) and a known pressure differential, the equipment can be calibrated to accurately correlate the size of the leak with the measured rate of change in concentration X in the recipient fluid.

Common salt in potable water at a concentration of 15 g/litre with a pressure differential of 45 psi (3 bar) can be detected leaking into soft water through a hole as small as 70 microns. Hence the equipment can be accurate enough to give an assurance of serviceability in applications where leakage through a defect of less than 70 microns is negligible.

Figure 2:
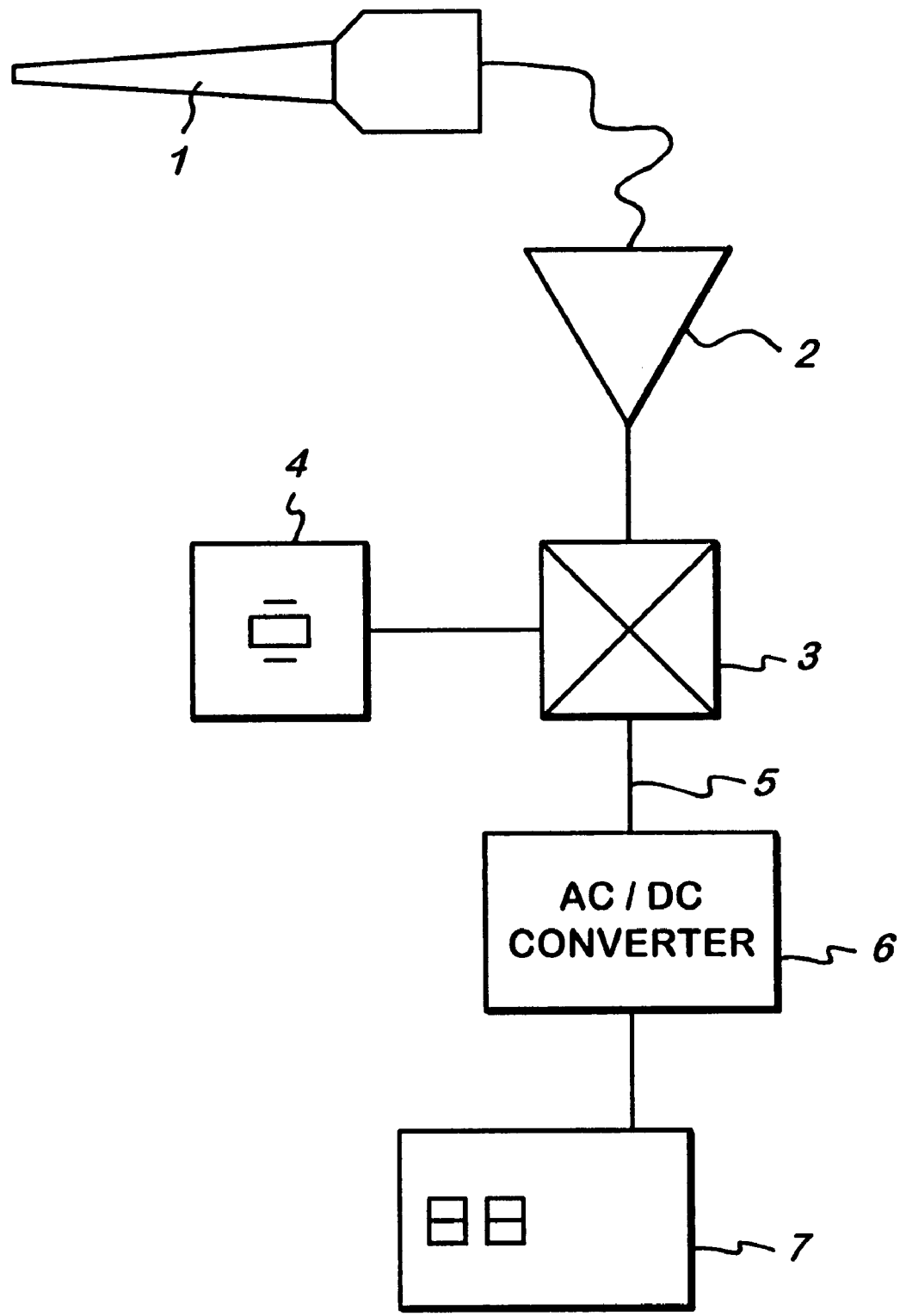
FIG. 2 is a block diagram of ultrasonic detection apparatus for use in a second testing method of the invention.

FIG. 2 shows another form of apparatus for leakage detection. An ultrasonic sensor probe 1 is connected to an input amplifier 2. A mixer 3 combines the output of the amplifier 2 with the output of a crystal oscillator 4 to produce a difference frequency in the audible range. The audio output 5 is fed to an ac/dc converter 6 to produce a dc output voltage which is proportional to the rms magnitude of the audio output 5, which is in turn proportional to the magnitude of the sound picked up by the sensor 1. The dc signal is fed to a two digit seven segment display 7 to give an output reading in decibels (dB).

Figure 3:
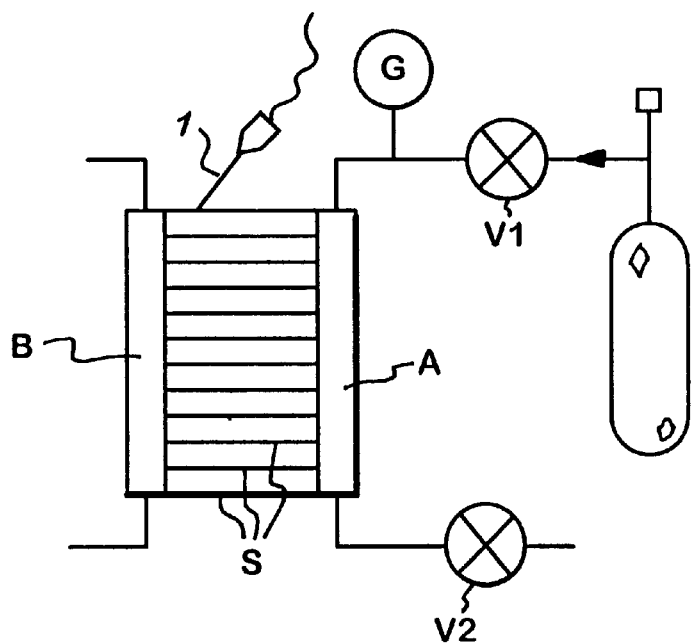
FIG. 3 is a diagrammatic representation of a dairy pasteuriser undergoing the second testing method using the apparatus of FIG. 2.

Referring now to FIG. 3, the dairy pasteuriser to be tested is a form of heat exchanger having a first path A for coolant and a second path B for the milk product. The two paths A and B are in intimate relationship via a series of heat exchange plates S to provide heat exchange between the two paths in normal use. Should any leaks develop between paths A and B, the product in path B will become contaminated with coolant.

The pasteurizer can be tested for leaks between paths A and B using the equipment of FIG. 2, without any necessity to dismantle the pasteuriser. A donor gas (e.g. air) is introduced into path A under pressure, while a recipient fluid (e.g. water) is introduced into path B. The pressure of air is path A can be set by means of a pressurising valve V1 and a pressure release valve V2, using a pressure gauge G.

The ultrasonic probe 1 is placed in contact with one of the heat exchange plates on the outside of the pasteuriser. The presence of a reading on the display 7 indicates that there is a leak between the first path A and the second path B, whereas no reading indicates that there is no leak present.

If a leak is indicated, the pressure in path A can be adjusted by the valves V1 and V2, with the probe 1 held in a fixed position, until a maximum reading (audibility) is obtained. By applying the probe 1 to each of the heat exchange plates in turn, on the outside of the pasteuriser, the plate/s with the highest reading can be identified, thus indicating the plate/s having a flaw. Appropriate remedial action can then be taken.

The same technique can also be used to pinpoint leakage through flaws which have previously been detected by other methods, such as that described in relation to FIG. 1.

I claim:

1. A method of testing a plate heat exchanger, having a series of heat exchange plates, for leakage between physically separate first and second fluid paths arranged in an intimate heat exchange relationship via the series of heat exchange plates, which comprises:

placing a donor fluid in the first path, placing a recipient fluid in the second path, applying a positive pressure differential between the donor and recipient fluids, and using electronic equipment to monitor for leakage of the donor fluid into the recipient fluid, the first and second paths being comprised in a heat exchanger for elevated temperature treatment of liquid food products, one of the first and second paths being a heating circuit and the other of the first and second paths being a product path.

2. A method according to claim 1, in which the electronic equipment monitors for leakage by analysing the recipient fluid for presence of the donor fluid.

3. A method according to claim 2 in which the donor fluid is an electrolyte and the recipient fluid a non-electrolyte, and the recipient fluid is analysed for presence of the donor fluid by measuring the electrical conductivity of the recipient fluid.

4. A method of testing a plate heat exchanger, having a series of heat exchange plates, for leakage between physically separate first and second fluid paths arranged in an intimate heat exchange relationship via the series of heat exchange plates, which comprises:

placing a donor fluid in the first path, placing a recipient fluid in the second path, applying a positive pressure differential between the donor and recipient fluids, and using electronic equipment to monitor for leakage of the donor fluid into the into the recipient fluid, the first and second paths being comprised in a pasteuriser, one of the first and second paths being a heating circuit and the other of the first and second paths being a product path.

* * * * *